US012567943B2

(12) United States Patent
Zavalney et al.

(10) Patent No.: US 12,567,943 B2
(45) Date of Patent: Mar. 3, 2026

(54) MITIGATING DIGITAL INTERFERENCE WITHIN RADIO FREQUENCY CIRCUITRY

(71) Applicant: Silicon Laboratories Inc., Austin, TX (US)

(72) Inventors: Paul Zavalney, Austin, TX (US); Phil Matthews, Driftwood, TX (US); John Khoury, Austin, TX (US); Francesco Barale, North Kingstown, RI (US)

(73) Assignee: Silicon Laboratories Inc., Austin, TX (US)

( * ) Notice: Subject to any disclaimer, the term of this patent is extended or adjusted under 35 U.S.C. 154(b) by 43 days.

(21) Appl. No.: 18/442,297

(22) Filed: Feb. 15, 2024

(65) Prior Publication Data

US 2025/0266981 A1     Aug. 21, 2025

(51) Int. Cl.
| | |
|---|---|
| *H04L 7/04* | (2006.01) |
| *G06F 1/12* | (2006.01) |
| *H04B 1/00* | (2006.01) |

(52) U.S. Cl.
CPC ................. *H04L 7/04* (2013.01); *G06F 1/12* (2013.01); *H04B 1/0082* (2013.01)

(58) Field of Classification Search
CPC ............ H04L 7/04; G06F 1/12; H04B 1/0082
USPC .......................................................... 375/343
See application file for complete search history.

(56) References Cited

U.S. PATENT DOCUMENTS

| | | | |
|---|---|---|---|
| 10,461,787 B2 | 10/2019 | Matthews et al. | |
| 11,374,600 B1 | 6/2022 | David et al. | |
| 2005/0157778 A1* | 7/2005 | Trachewsky | ........ H04L 27/0014 375/221 |
| 2018/0115409 A1* | 4/2018 | Nayyar | ................. G01S 13/343 |

* cited by examiner

*Primary Examiner* — Dominic D Saltarelli
(74) *Attorney, Agent, or Firm* — Trop, Pruner & Hu, P.C.

(57) ABSTRACT

In one aspect, an apparatus includes: radio frequency (RF) circuitry to transmit and receive RF signals, the RF circuitry to operate with a local oscillator (LO) clock signal; clock circuitry to receive the LO clock signal and generate an LO-derived clock signal therefrom; first digital circuitry to communicate data according to a first digital clock signal; and a controller coupled to the first digital circuitry to select one of the LO-derived clock signal or a source clock signal to provide to the first digital circuitry as the first digital clock signal.

17 Claims, 5 Drawing Sheets

100

MITIGATING DIGITAL INTERFERENCE WITHIN RADIO FREQUENCY CIRCUITRY

BACKGROUND

In integrated circuits, digital activity and high-speed communications on input/output (I/O) pads can interfere with radio frequency (RF) communication. Such interference is especially common when digital circuitry and RF circuitry are located within the same integrated circuit. Current solutions to reduce and mitigate such radio interference are complex and can adversely affect the ability to maintain high digital communication bandwidth while radio activity is occurring.

SUMMARY OF THE INVENTION

In one aspect, an apparatus includes: radio frequency (RF) circuitry to transmit and receive RF signals, the RF circuitry to operate with a local oscillator (LO) clock signal; clock circuitry to receive the LO clock signal and generate an LO-derived clock signal therefrom; first digital circuitry to communicate data according to a first digital clock signal; and a controller coupled to the first digital circuitry to select one of the LO-derived clock signal or a source clock signal to provide to the first digital circuitry as the first digital clock signal.

In one implementation, the controller is to dynamically select the one of the LO-derived clock signal or the source clock signal to provide to the first digital circuitry as the first digital clock signal based at least in part on radio activity of the RF circuitry.

In one implementation, the apparatus may further include a selection circuit coupled to the controller, the controller to control the selection circuit to output the selected one of the LO-derived clock signal or the source clock signal. The controller: in response to a channel change occurrence in the RF circuitry, is to cause the selection circuit to output the source clock signal; and in response to a completion of the channel change occurrence in the RF circuitry, is to cause the selection circuit to output the LO-derived clock signal.

In one implementation, the first digital circuitry comprises input/output circuitry to communicate data via a communication protocol having a variable clock frequency and data rate. The controller, in response to inactivity of the RF circuitry, is to cause the selection circuit to output the source clock signal as the first digital clock signal. The clock circuitry may include a frequency divider to divide the LO clock signal by a programmable value to obtain the LO-derived clock signal, the programmable value based at least in part on a frequency of the LO clock signal.

In one implementation, the clock circuitry is to generate the LO-derived clock signal having a frequency that is less than or equal to a maximum frequency for the communication protocol and equal to or greater than a minimum frequency for the communication protocol. The apparatus may further include second clock circuitry to generate the source clock signal having a frequency that is at least substantially equal to a maximum frequency of the communication protocol, where the LO-derived clock signal is less than or equal to the frequency of the second clock signal.

In one implementation, the controller is to select the LO-derived clock signal to provide to the first digital circuitry as the first digital clock signal when the RF circuitry is communicating. The apparatus may further include second digital circuitry to perform digital processing, wherein the second digital circuitry is to operate according to another clock signal.

In another aspect, a method comprises: determining, in a controller of a wireless device, that a radio frequency (RF) circuit of the wireless device is communicating RF signals; in response to determining that the RF circuit is communicating the RF signals, providing a local oscillator (LO)-derived clock signal to a first digital circuit of the wireless device as a digital clock signal; and in response to determining that the RF circuit is not communicating the RF signals, providing a source clock signal to the first digital circuit as the digital clock signal.

In one implementation, the method further comprises providing the source clock signal to the first digital circuit as the digital clock signal when an LO of the RF circuit is changing between a first frequency and a second frequency. The method also may include, following the frequency change of the LO, providing the LO-derived clock signal at the second frequency to the first digital circuit as the digital clock signal.

In one implementation, the method further includes providing a control signal from the controller to a multiplexer of the wireless device to cause the LO-derived clock signal to be provided to the first digital circuit as the digital clock signal. The method also may include communicating data from the first digital circuit using the digital clock signal. In one implementation, the method may further include: communicating a first portion of the data from the first digital circuit using the digital clock signal obtained from the LO-derived clock signal; and communicating a second portion of the data from the first digital circuit using the digital clock signal obtained from the source clock signal, the source clock signal having a higher frequency than the LO-derived clock signal.

In yet another aspect, a system includes: an antenna to transmit and receive RF signals; and an integrated circuit coupled to the antenna. The integrated circuit may include: a LO to generate a LO clock signal; RF circuitry to communicate the RF signals with the antenna, the RF circuitry comprising at least one mixer to use the LO clock signal; a clock divider coupled to the LO to generate an LO-derived clock signal from the LO clock signal; a clock generator to generate a source clock signal; a selection circuit to receive the LO-derived clock signal and the source clock signal and output a digital clock signal comprising a selected one of the LO-derived clock signal or the source clock signal; a controller to control the selection circuit to output the digital clock signal as the selected one of the LO-derived clock signal or the source clock signal based at least in part on activity of the RF circuitry; and digital circuitry coupled to the selection circuit, the digital circuitry to communicate data according to the digital clock signal.

In one implementation: when the RF circuitry is active, the digital circuitry is to communicate the data according to the digital clock signal having a frequency of the LO-derived clock signal; and when the RF circuitry is inactive, the digital circuitry is to communicate the data according to the digital clock signal having a frequency of the source clock signal.

In an implementation, the controller: in response to determining that the RF circuitry is communicating the RF signals, is to control the selection circuit to output the digital clock signal as the LO-derived clock signal; and in response to determining that the RF circuitry is not communicating the RF signals, is to control the selection circuit to output the digital clock signal as the source clock signal.

DETAILED DESCRIPTION

In various embodiments, a type of frequency planning can be implemented to reduce interference between digital activity and radio activity within an integrated circuit. This is so, since certain digital communication protocols can operate across a wide frequency range and operate with varying frequency (with a maximum frequency limit), and do not require long-term constant frequency operation. In other words, these protocols do not require an accurate time base (i.e., do not require an accurate average frequency over long durations) and can dynamically switch clock frequencies. Such protocols include certain serial peripheral interface (SPI) or parallel memory interfaces, as examples.

Embodiments may leverage this condition by dynamically providing a clock signal of varying frequency to digital circuitry that communicates according to such protocols. In this way, this digital circuitry can be provided with a clock signal having a frequency with harmonics that avoid one or more frequency bands at which radio circuitry operates. The data lines are random and contribute energy in the frequency regions around the typically dominant clock harmonics.

Figure 1:
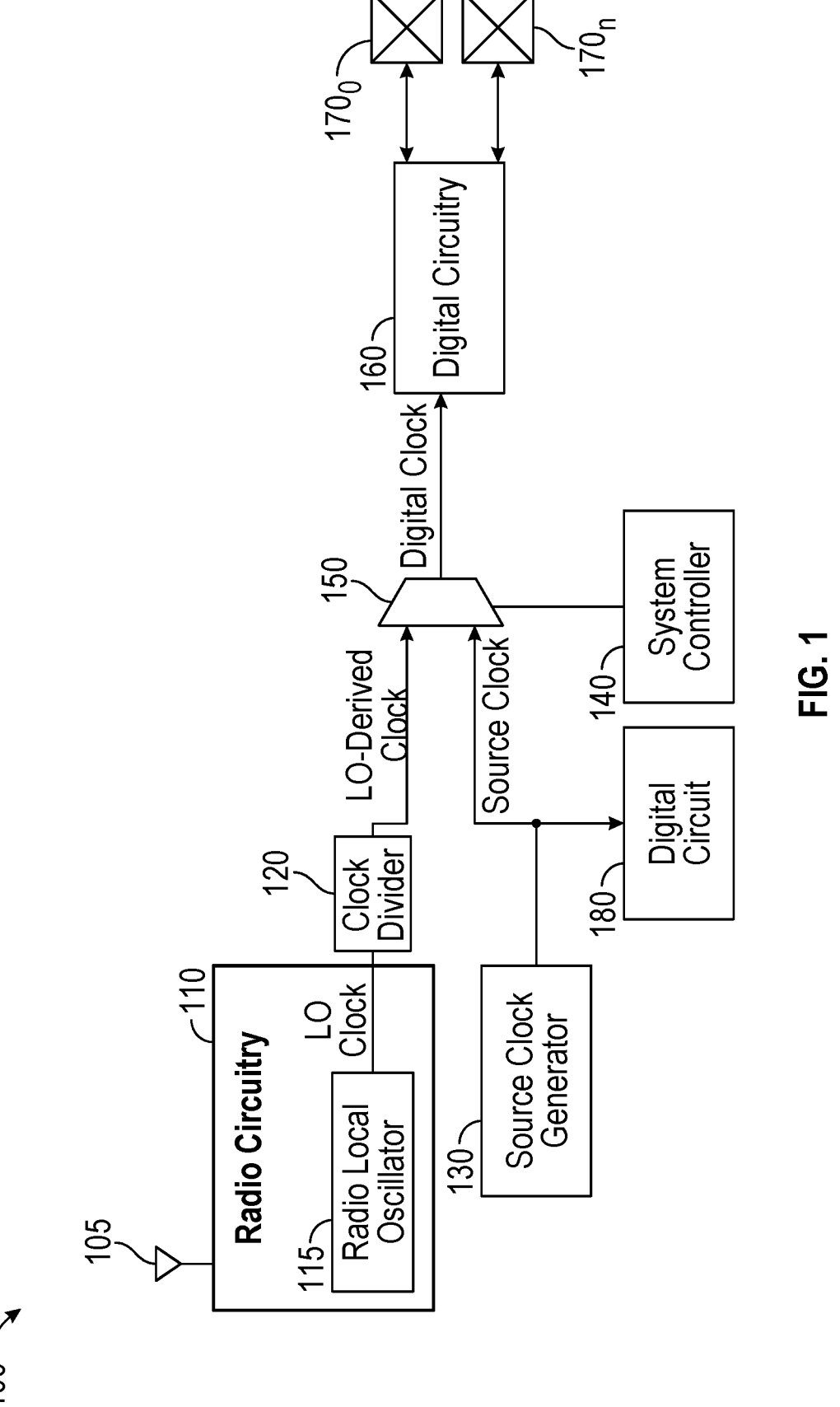
FIG. 1 is a block diagram of a device in accordance with an embodiment.

Referring now to FIG. 1, shown is a block diagram of a device in accordance with an embodiment. As shown in FIG. 1, device 100 may be any type of device having wireless capability, ranging from a computer such as desktop, laptop, tablet, to a smartphone or Internet of Things (IoT) device, and so forth. In the high level shown in FIG. 1, understand that only a portion of device 100 is illustrated.

As seen, radio frequency (RF) communications occur via an antenna 105 that couples to radio circuitry 110. Radio circuitry 110 includes various RF circuitry, including amplifiers, mixers, filters, and so forth. In an embodiment, radio circuitry 110 performs both transmit and receive operations. To this end, radio circuitry 110 includes a radio local oscillator (LO) 115 that generates LO clock signals that are used for radio communications. For example, for communicating in a wireless local area network (WLAN) or a wireless personal area network (WPAN), radio LO 115 may generate an LO clock signal at a frequency of between approximately 2.4-2.5 gigahertz (GHz). One or more mixers of radio circuitry 110 may use this LO clock signal as a mixing signal to perform upconversion and/or downconversion operations. Of course, other LO clock signal frequencies may also be used.

As illustrated, radio LO 115 outputs an LO clock signal that, in addition to being used within radio circuitry 110 (such as for one or more mixers), also is provided to a clock divider 120. While shown as a separate circuit in the embodiment of FIG. 1, it is possible for clock divider 120 to be present within radio circuitry 110. In embodiments herein, clock divider 120 may be configured as an integer divider (e.g., a divide by 4 or divide by 6 divider) to divide the incoming LO clock signal down to a lower frequency.

More specifically, clock divider 120 may be programmably controlled to divide the LO clock signal to a frequency that is at least approximately around a maximum clock frequency of a given communication protocol. Although embodiments are not limited in this regard, in one example use case in connection with a given SPI communication protocol (such as a quad SPI (QSPI) protocol), this maximum clock signal may be set at 120 megahertz (MHz). As such, clock divider 120 may be configured to divide the LO clock signal to a frequency of 120 MHz or below. Clock divider 120 thus outputs a LO-derived clock signal at a substantially lower frequency than the LO clock signal.

Still with reference to FIG. 1, this LO-derived clock signal output from clock divider 120 is provided to a selection circuit 150, implemented in the embodiment of FIG. 1 as a multiplexer. More specifically, selection circuit 150 may be implemented in one or more embodiments as a glitchless multiplexer. Selection circuit 150 is further coupled to receive a source clock signal from a source clock generator 130. In embodiments, source clock generator 130 may be a phase lock loop (PLL) or another clock generator that is configured to generate the source clock signal, which may be used by various digital circuitry within device 100. Although embodiments are not limited in this regard, the source clock signal may have a frequency of between approximately 100 MHz and 240 MHz. In particular implementations, source clock generator 130 may be configured to generate the source clock signal at a maximum frequency supported by the communication protocol to ensure maximum data transfer rates. In the context of QSPI communications, this maximum frequency is 208 MHz.

As shown, device 100 includes a digital circuit 180, which may be some type of processing circuit such as a microcontroller or so forth, that operates according to the source clock signal. Or in other cases, digital circuit 180 may operate using a different clock signal, either generated in source clock generator 130 or another clock generator.

Still with reference to FIG. 1, a system controller 140 is present. System controller 140 may be a microcontroller or other programmable circuitry configured to execute instructions such as may be stored in a non-transitory storage medium. System controller 140 may control operation of radio circuitry 110 and the various digital circuitry.

In addition, system controller 140 is configured, based at least in part on radio activity, to dynamically control a selection circuit 150, to selectively output one of the LO-derived clock signal and source clock signal as a digital clock signal to additional digital circuitry 160. In embodiments, digital circuitry 160 may be various circuitry of apparatus 100 that can operate according to a dynamically switchable clock frequency. Such circuitry includes I/O circuitry for a communication protocol that allows a varying frequency range and does not require a long-term constant frequency. Understand that such I/O circuitry may include receivers, drivers, buffers and so forth. Of course, digital circuitry 160 also may include other processing circuitry. For example, digital circuitry 160 may include any type of digital processing circuitry that does not have a long time base. As one specific example, such circuitry may include a cyclic redundancy checksum (CRC) computing circuit.

In the high level shown in FIG. 1, digital circuitry 160 couples to I/O pads $170_0$-$170_n$ via which it may communicate data of one or more communication protocols with one or more devices to which apparatus 100 is coupled. For example, a memory such as a non-volatile and/or random access memory may couple to I/O pads 170 and communicate according to a quad SPI (QSPI) or other SPI communication protocol. Other types of devices such as sensors or so forth also may couple via an interface that can operate at dynamic clock frequencies.

With embodiments, controller 140 is configured to mitigate interference between data communications via I/O pads 170 and radio communications via radio circuitry 110 by dynamically controlling digital circuitry 160 to operate with the LO-derived clock signal as the digital clock signal that is provided to it when radio circuitry 110 is active. Instead, when radio circuitry 110 is inactive (and as such, radio LO 115 also is inactive), digital circuitry 160 is provided with the digital clock signal originating from source clock generator 130. While shown at this high level in the embodiment of FIG. 1, many variations and alternatives are possible.

Figure 2:
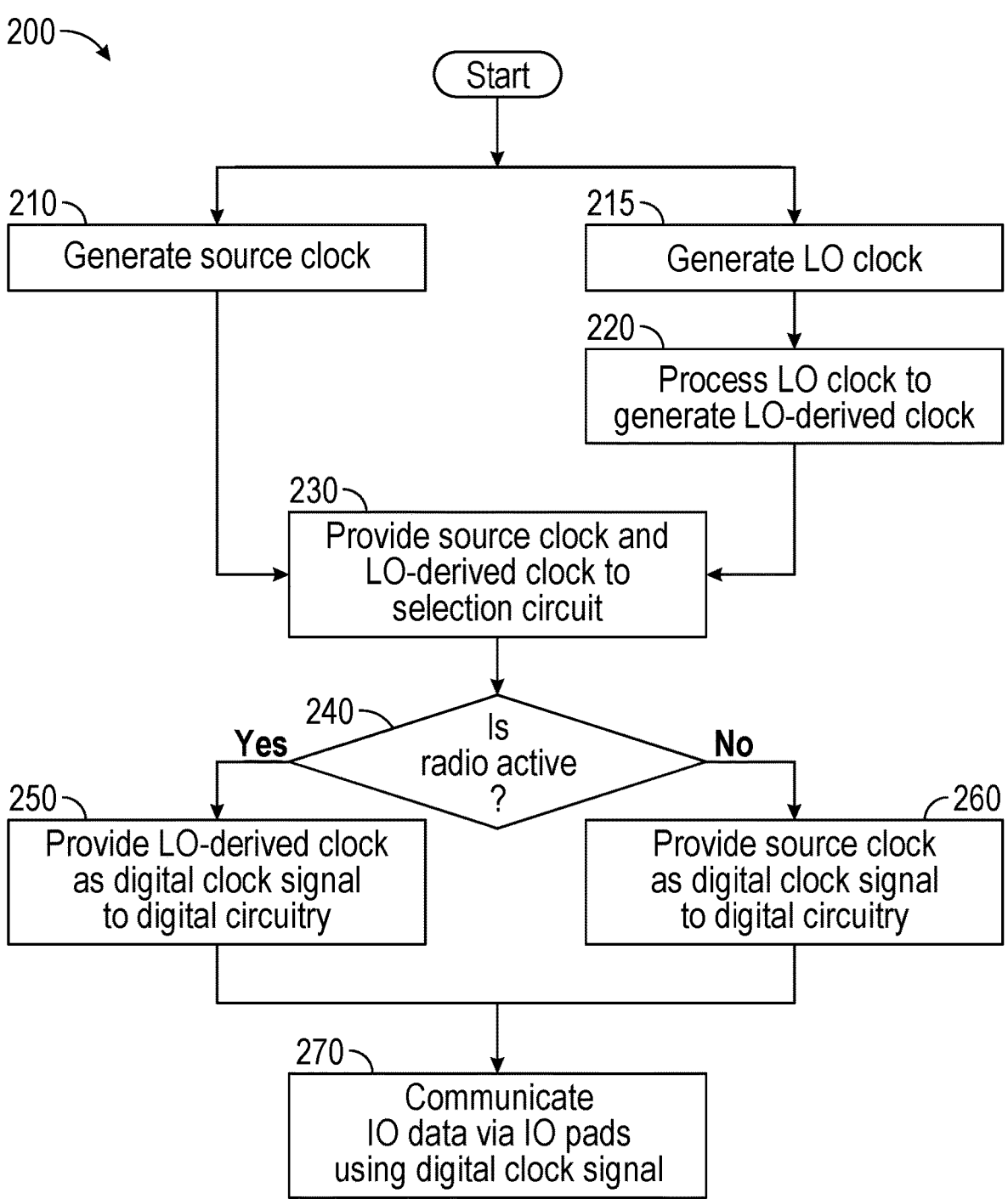
FIG. 2 is a flow diagram of a method in accordance with an embodiment.

Referring now to FIG. 2, shown is a flow diagram of a method in accordance with an embodiment. More specifically, method 200 is a method for dynamically providing a selected one of multiple clock signals to digital circuitry. In embodiments, method 200 may be performed by a controller such as a microcontroller or other programmable circuitry configured to execute instructions stored in a non-transitory storage medium, alone and/or in combination with firmware and/or software. This controller may control radio operation and other operations within a device.

In general, method 200 may be used to dynamically select one of multiple clock signals to be provided to at least a portion of digital circuitry to enable that circuitry to operate at a dynamically programmable frequency, in order to reduce interference with radio operation. More particularly, embodiments enable high-speed digital communication bandwidth while a radio (and its LO) is off, and a quick transition to an LO-derived clock signal to reduce radio interference with minimal performance impact when the radio is on. Clocking at least certain digital circuitry with this LO-derived clock signal may reduce overall interference from the digital I/O data to the radio.

As shown, method 200 begins by generating a source clock signal and an LO clock signal (blocks 210 and 215). A source clock generator such as a PLL may be used to generate the source clock signal, while an LO such as present in an RF circuit may generate the LO clock signal. Next at block 220, the LO clock signal is processed to generate an LO-derived clock signal. As discussed above, this LO-derived clock signal may be at a substantially lower frequency than the LO clock signal. For example, the LO clock signal may be at approximately 2.4 GHz, while the LO-derived clock signal may be at approximately 120 MHz.

Still referring to FIG. 2, next at block 230, the source clock signal and the LO-derived clock signal are provided to a selection circuit, e.g., a multiplexer. Next at diamond 240, it is determined whether the radio is active. This determination may be based on whether ongoing RF communications are occurring, which may be determined by the controller. If it is determined that the radio is active (and thus the LO is operating), control passes to block 250 where the LO-derived clock signal is provided as a digital clock signal to digital circuitry. To this end, the controller generates a control signal that it provides to the multiplexer to cause the multiplexer to output this LO-derived clock signal as the digital clock signal.

Instead, when it is determined that the radio is inactive (and thus the LO is not operating), control passes to block 260 where the source clock signal is provided as the digital clock signal to the digital circuitry. To this end, the controller generates a control signal that it provides to the multiplexer to cause the multiplexer to output the source clock signal (which may be at a different, e.g., higher clock frequency than the LO-derived clock signal (e.g., a maximum allowed operating frequency for the communication protocol)) as the digital clock signal. In either case, control passes to block 270 where I/O data may be communicated via I/O pads using this digital clock signal. Understand that regardless of which signal is provided to the I/O circuitry as the digital clock signal, the communications may occur at varying frequencies that equal or are less than the maximum allowed operating frequency for the communication protocol. Note that as the controller is controlling the data rate of the communication protocol, this device is necessarily the "master" of the communication protocol.

Although data communications with another device are illustrated at block 270 as a specific use case for a digital clock signal that is programmably controlled to be at different frequencies depending on radio activity, other use cases are possible. For example as discussed above, this digital clock signal of dynamic frequency can be used in performing data processing operations such as CRC calculations.

Note that the determination at diamond 240 is not strictly limited to whether a radio is active or not, and further encompasses determinations as to whether there is a change in radio activity, such as selection of a different channel that entails a change in the frequency of the LO clock signal. In such instances, a similar change may occur from selection of the LO-derived clock signal to the source clock signal for use as the digital clock signal. In this way, continued I/O data communications can occur while an LO is re-synchronizing to a new clock frequency. Understand that at the completion of such frequency change, the controller may cause the multiplexer to output the LO-derived clock signal (at a new frequency) as the digital clock signal. Although shown at this high level in the embodiment of FIG. 2, many variations and alternatives are possible.

Figure 3:
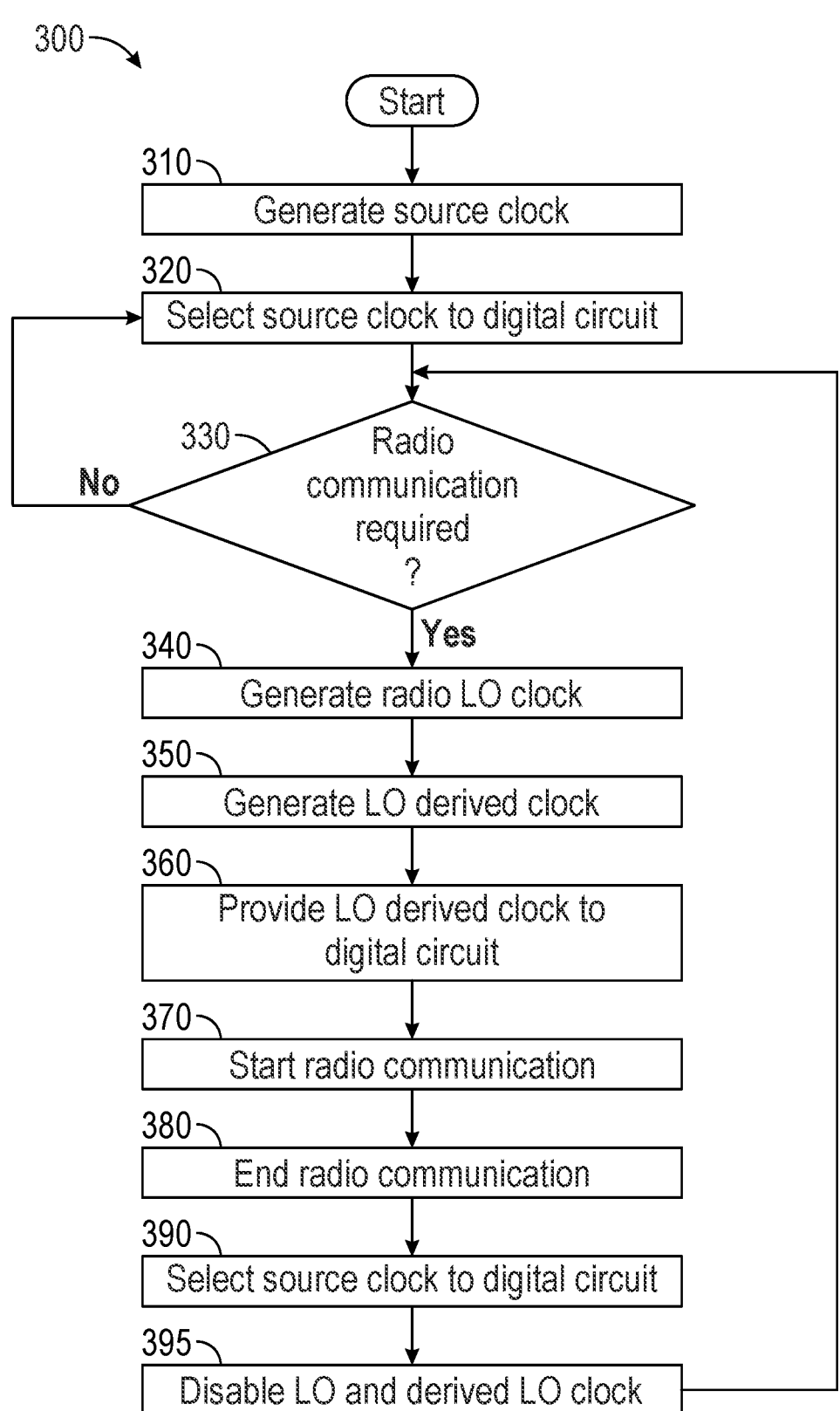
FIG. 3 is a flow diagram of a method in accordance with another embodiment.

Referring now to FIG. 3, shown is a flow diagram of a method in accordance with an embodiment. More specifically, method 300 is another method for dynamically providing a selected one of multiple clock signals to digital circuitry, such as may be performed by a controller, as described above.

In the implementation of FIG. 3, method 300 begins when radio circuitry is inactive and digital circuitry is operating using a source clock signal. Thus method 300 begins by generating the source clock signal selecting it to provide to a digital circuit (e.g., an I/O circuit) (blocks 310 and 320). I/O communications, e.g., with an attached memory may occur using this source clock signal, while no radio communications are happening.

Still referring to FIG. 3, next at diamond 330, it is determined whether a radio communication is required. If not, the digital circuit may continue to operate using the source clock signal (at block 320). Instead, when it is determined that radio communications are to occur, control passes to block 340 where a LO is enabled and a radio LO clock signal is generated. Then at block 350 a LO-derived clock signal is generated, e.g., according to a desired clock divide ratio.

Still with reference to FIG. 3, at block 360 this LO-derived clock signal is provided as the digital clock signal to the digital circuitry. At block 370 the radio communication may be started, as interference with digital circuitry can be avoided by the frequency planning inherent in the LO-derived I/O data rate. After completion of the radio communication (block 380), control passes to block 390 where the source clock signal can again be selected to provide to the digital circuitry. Since the radio communication has ended, the LO and the LO-derived clock may no longer be generated and the LO and clock divider circuitry can be disabled (block 395). Control passes back to diamond 330 to determine whether additional radio communication is needed. Understand that while the radio remains inactive, I/O communications and other digital activity may be performed using the source clock signal. Although shown at this high level in the embodiment of FIG. 3, many variations and alternatives are possible.

Figure 4:
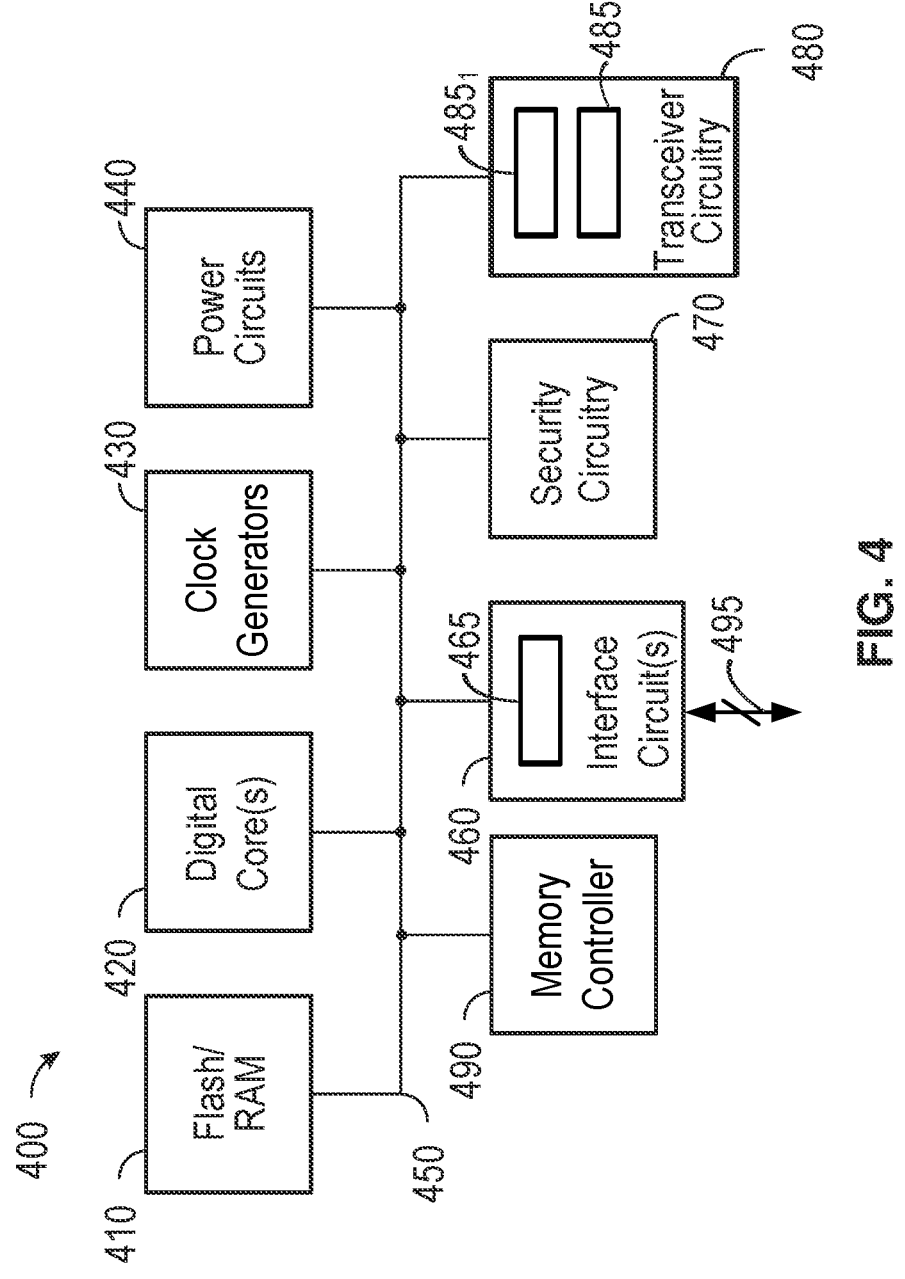
FIG. 4 is a block diagram of a representative integrated circuit that incorporates an embodiment.

Referring now to FIG. 4, shown is a block diagram of a representative integrated circuit 400 that includes circuitry to dynamically switch between different clock signals for interface circuitry based at least in part on radio activity, as described herein. In the embodiment shown in FIG. 4, integrated circuit 400 may be, e.g., a dual mode wireless transceiver that may operate according to one or more wireless protocols (e.g., WLAN and Bluetooth, among others) or other device that can be used in a variety of use cases. In one or more embodiments, the circuitry of integrated circuit 400 shown in FIG. 4 may be implemented on a single semiconductor die.

Integrated circuit 400 may be included in a range of devices including a variety of stations, including smartphones, wearables, smart home devices, IoT devices, other consumer devices, or industrial, scientific, and medical (ISM) devices, among others.

In the embodiment shown, integrated circuit 400 includes a memory system 410 which in an embodiment may include volatile storage, such as RAM and non-volatile memory as a flash memory. The flash memory is a non-transitory storage medium that can store instructions and data. Such non-volatile memory may store instructions, including instructions for identifying conditions that may trigger a change between interface circuitry clock signals, as described herein. As further shown integrated circuit 400 also may include a memory controller 490.

Memory system 410 couples via a bus 450 to one or more digital cores 420, which may include one or more cores and/or microcontrollers that act as processing units of the integrated circuit. In turn, digital cores 420 may couple to clock generators 430 which may provide one or more phase locked loops or other clock generator circuitry to generate various clocks for use by circuitry of the IC. In embodiments herein, this clock circuitry may generate a source clock and an LO-derived clock, as discussed above.

As further illustrated, IC 400 further includes power circuitry 440, which may include one or more voltage regulators. Additional circuitry may be present depending on particular implementation to provide various functionality and interaction with external devices. Such circuitry may include interface circuitry 460 which provides a digital communication interface with additional circuitry (such as a memory, to couple to IC 400 via a link 495), and which may communicate using a selectable one of a source clock signal and a LO-derived clock signal, as discussed herein. Interface circuitry 460 includes a controller 465, which may select a given one of these multiple clock signals based at least in part on radio activity. IC 400 also may include security circuitry 470 to perform wireless security techniques.

In addition, as shown in FIG. 4, transceiver circuitry 480 may be provided to enable transmission and receipt of wireless signals, e.g., according to one or more of a local area or wide area wireless communication scheme, such as Zigbee, Bluetooth, IEEE 802.11, IEEE 802.15.4, cellular communication or so forth. As shown, transceiver circuitry 480 includes multiple transceiver circuits 485$_{1-n}$, to communicate according to multiple wireless communication protocols. Understand while shown with this high level view, many variations and alternatives are possible.

Figure 5:
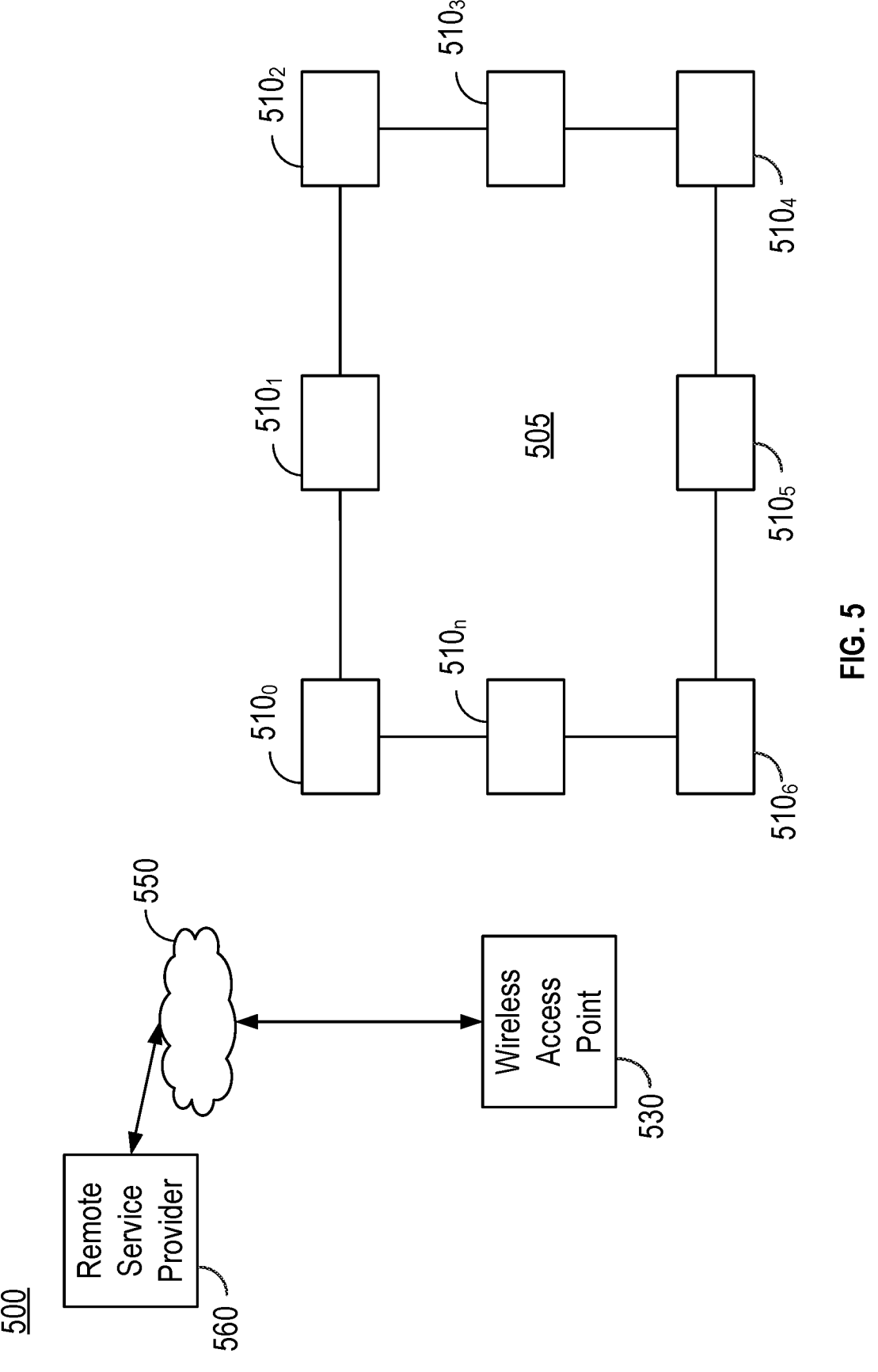
FIG. 5 is a high level diagram of a network in accordance with an embodiment.

ICs such as described herein may be implemented in a variety of different devices such as wireless stations, IoT devices or so forth. Referring now to FIG. 5, shown is a high level diagram of a network in accordance with an embodiment. As shown in FIG. 5, a network 500 includes a variety of devices, including wireless stations including smart devices such as IoT devices, access points and remote service providers, which may leverage embodiments for dynamically switching between different clock signals for performing digital communication, based at least in part on radio activity as described herein.

In the embodiment of FIG. 5, a wireless network 505 is present, e.g., in a building having multiple wireless devices 510$_{0-n}$. As shown, wireless devices 510 couple to an access point 530 that in turn communicates with a remote service provider 560 via a wide area network 550, e.g., the internet. Understand while shown at this high level in the embodiment of FIG. 5, many variations and alternatives are possible.

Embodiments thus enable mitigation of radio interference due to digital activity occurring at a frequency having interfering harmonics. Furthermore, embodiments enable data communications or other digital activity to occur at a maximum bandwidth while reducing complexity such as the need for carefully controlling frequency updates by way of a retimed clock having jittered edges. Still further, embodiments enable rapid transitions between selection of a first clock signal and a second clock signal, e.g., within a few clock cycles.

While the present disclosure has been described with respect to a limited number of implementations, those skilled in the art, having the benefit of this disclosure, will appreciate numerous modifications and variations therefrom. It is intended that the appended claims cover all such modifications and variations.

What is claimed is:

1. An apparatus comprising:
radio frequency (RF) circuitry to transmit and receive RF signals, the RF circuitry to upconvert and downconvert the RF signals using a local oscillator (LO) clock signal;
clock circuitry to receive the LO clock signal and generate an LO-derived clock signal therefrom;
first digital circuitry to communicate data according to a first digital clock signal;
a controller coupled to the first digital circuitry, the controller to select one of the LO-derived clock signal or a source clock signal to provide to the first digital circuitry as the first digital clock signal; and
a selection circuit coupled to the controller, the controller to control the selection circuit to output the selected one of the LO-derived clock signal or the source clock signal, wherein the controller:
in response to a channel change occurrence in the RF circuitry, is to cause the selection circuit to output the source clock signal; and
in response to a completion of the channel change occurrence in the RF circuitry, is to cause the selection circuit to output the LO-derived clock signal.

2. The apparatus of claim 1, wherein the controller is to dynamically select the one of the LO-derived clock signal or the source clock signal to provide to the first digital circuitry as the first digital clock signal based at least in part on radio activity of the RF circuitry.

3. The apparatus of claim 1, wherein the first digital circuitry comprises input/output circuitry to communicate data via a communication protocol having a variable clock frequency and data rate.

4. The apparatus of claim 3, wherein the controller, in response to inactivity of the RF circuitry, is to cause the selection circuit to output the source clock signal as the first digital clock signal.

5. The apparatus of claim 3, wherein the clock circuitry comprises a frequency divider to divide the LO clock signal by a programmable value to obtain the LO-derived clock signal, the programmable value based at least in part on a frequency of the LO clock signal.

6. The apparatus of claim 3, wherein the clock circuitry is to generate the LO-derived clock signal having a frequency that is less than or equal to a maximum frequency for the communication protocol and equal to or greater than a minimum frequency for the communication protocol.

7. The apparatus of claim 3, further comprising second clock circuitry to generate the source clock signal having a frequency that is at least substantially equal to a maximum frequency of the communication protocol, and wherein the LO-derived clock signal is less than or equal to the frequency of the second clock signal.

8. The apparatus of claim 7, further comprising second digital circuitry to perform digital processing, wherein the second digital circuitry is to operate according to another clock signal.

9. The apparatus of claim 1, wherein the controller is to select the LO-derived clock signal to provide to the first digital circuitry as the first digital clock signal when the RF circuitry is communicating.

10. A method comprising:

determining, in a controller of a wireless device, that a radio frequency (RF) circuit of the wireless device is communicating RF signals;

in response to determining that the RF circuit is communicating the RF signals, providing a local oscillator (LO)-derived clock signal to a first digital circuit of the wireless device as a digital clock signal; and in response to determining that the RF circuit is not communicating the RF signals, providing a source clock signal to the first digital circuit as the digital clock signal when an LO of the RF circuit is changing between a first frequency and a second frequency.

11. The method of claim 10, further comprising following the frequency change of the LO, providing the LO-derived clock signal at the second frequency to the first digital circuit as the digital clock signal.

12. The method of claim 10, further comprising providing a control signal from the controller to a multiplexer of the wireless device to cause the LO-derived clock signal to be provided to the first digital circuit as the digital clock signal.

13. The method of claim 10, further comprising communicating data from the first digital circuit using the digital clock signal.

14. The method of claim 13, further comprising:

communicating a first portion of the data from the first digital circuit using the digital clock signal obtained from the LO-derived clock signal; and communicating a second portion of the data from the first digital circuit using the digital clock signal obtained from the source clock signal, the source clock signal having a higher frequency than the LO-derived clock signal.

15. A system comprising:

an antenna to transmit and receive radio frequency (RF) signals; and an integrated circuit coupled to the antenna, the integrated circuit comprising:

a local oscillator (LO) to generate a LO clock signal;

RF circuitry to communicate the RF signals with the antenna, the RF circuitry comprising at least one mixer to use the LO clock signal;

a clock divider coupled to the LO to generate an LO-derived clock signal from the LO clock signal;

a clock generator to generate a source clock signal;

a selection circuit to receive the LO-derived clock signal and the source clock signal and output a digital clock signal comprising a selected one of the LO-derived clock signal or the source clock signal;

a controller to control the selection circuit to output the digital clock signal as the selected one of the LO-derived clock signal or the source clock signal based at least in part on activity of the RF circuitry; and digital circuitry coupled to the selection circuit, the digital circuitry to communicate data according to the digital clock signal.

16. The system of claim 15, wherein:

when the RF circuitry is active, the digital circuitry is to communicate the data according to the digital clock signal having a frequency of the LO-derived clock signal; and when the RF circuitry is inactive, the digital circuitry is to communicate the data according to the digital clock signal having a frequency of the source clock signal.

17. The system of claim 15, wherein the controller:

in response to determining that the RF circuitry is communicating the RF signals, is to control the selection circuit to output the digital clock signal as the LO-derived clock signal; and in response to determining that the RF circuitry is not communicating the RF signals, is to control the selection circuit to output the digital clock signal as the source clock signal.

* * * * *